US010726135B2

(12) United States Patent
Wang et al.

(10) Patent No.: US 10,726,135 B2
(45) Date of Patent: Jul. 28, 2020

(54) WEB PAGE PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Jian Wang, Shenzhen (CN); Guoyang Du, Shenzhen (CN); Hu Cheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/299,883

(22) Filed: Mar. 12, 2019

(65) Prior Publication Data

US 2019/0205546 A1 Jul. 4, 2019

Related U.S. Application Data

(63) Continuation of application No. PCT/CN2017/109037, filed on Nov. 2, 2017.

(30) Foreign Application Priority Data

Nov. 10, 2016 (CN) .......................... 2016 1 0989440

(51) Int. Cl.
*H04L 9/00* (2006.01)
*G06F 21/57* (2013.01)
(Continued)

(52) U.S. Cl.
CPC ............ *G06F 21/577* (2013.01); *G06F 9/542* (2013.01); *G06F 16/9535* (2019.01);
(Continued)

(58) Field of Classification Search
CPC ...................................................... G06F 21/577
(Continued)

(56) References Cited

U.S. PATENT DOCUMENTS 9,147,210 B2 * 9/2015 Scipioni .................. G06F 21/36
9,489,682 B2 * 11/2016 Rabii ................. G06Q 30/0269
(Continued)

FOREIGN PATENT DOCUMENTS

CN 103327104 A 9/2013
CN 103729784 A 4/2014
(Continued)

OTHER PUBLICATIONS

The World Intellectual Property Organization (WIPO) International Search Report for PCT/CN2017/109037 dated Jan. 25, 2018 6 Pages (including translation).
(Continued)

*Primary Examiner* — Christopher J Brown
(74) *Attorney, Agent, or Firm* — Anova Law Group, PLLC (57) ABSTRACT

The present disclosure provides a web page processing method. The method includes obtaining web page elements after web page rendering is performed on a to-be-accessed web page; detecting whether an abnormal element exists in the web page elements; generating and displaying an interaction entrance on the to-be-accessed web page if an abnormal element exists in the web page elements; and obtaining a trigger operation on the interaction entrance and filtering out the abnormal element in response to the trigger operation.

17 Claims, 6 Drawing Sheets

(51) Int. Cl.
    *G06F 16/957*     (2019.01)
    *G06F 21/12*     (2013.01)
    *G06F 9/54*     (2006.01)
    *G06F 16/9535*     (2019.01)
    *G06F 21/56*     (2013.01)

(52) U.S. Cl.
    CPC ........ *G06F 16/9577* (2019.01); *G06F 21/125* (2013.01); *G06F 21/56* (2013.01); *G06F 2221/032* (2013.01); *G06F 2221/034* (2013.01)

(58) Field of Classification Search
    USPC .......................................................... 726/22
    See application file for complete search history.

(56) References Cited

U.S. PATENT DOCUMENTS

| | | | |
|---|---|---|---|
| 10,354,004 B2 * | 7/2019 | Karunamuni | ......... G06Q 10/10 |
| 2011/0078558 A1 | 3/2011 | Bao et al. | |
| 2016/0019092 A1 * | 1/2016 | Yuan | ................... G06F 9/44594 718/107 |
| 2016/0350798 A1 * | 12/2016 | Kornacki | ........... G06Q 30/0246 |
| 2017/0060986 A1 * | 3/2017 | Ideses | ................... G06F 17/212 |

FOREIGN PATENT DOCUMENTS

| | | |
|---|---|---|
| CN | 104216929 A | 12/2014 |
| CN | 104572798 A | 4/2015 |
| CN | 105701154 A | 6/2016 |
| CN | 106095869 A | 11/2016 |
| CN | 106708502 A | 5/2017 |

OTHER PUBLICATIONS

The State Intellectual Property Office of the People's Republic of China (SIPO) Office Action 1 for 201610989440.3 dated May 9, 2018 8 Pages (including translation).

The State Intellectual Property Office of the People's Republic of China (SIPO) Office Action 2 for 201610989440.3 dated Dec. 21, 2018 7 Pages (including translation).

* cited by examiner

WEB PAGE PROCESSING METHOD AND APPARATUS, AND STORAGE MEDIUM

RELATED APPLICATIONS

This application is a continuation application of PCT Patent Application No. PCT/CN2017/109037, filed on Nov. 2, 2017, which claims priority to Chinese Patent Application No. 201610989440.3, entitled "WEB PAGE PROCESSING METHOD AND APPARATUS" filed with the Chinese Patent Office on Nov. 10, 2016, which is incorporated by reference in its entirety.

FIELD OF TECHNOLOGY

This application relates to the field of Internet technologies and, in particular, to a web page processing method and apparatus, and a storage medium.

BACKGROUND OF THE DISCLOSURE

When opened by using a browser, many web pages usually display a lot of abnormal web page elements, such as advertisement content, fraudulence content, fake content and vulgar content, that are irrelevant to a theme of the web pages and are nuisances. The abnormal web page elements on the web pages cause great inconvenience for a user to browse the web pages. For example, when downloading software on a downloading website, the user is usually misled to download malicious software. For another example, when a website is to be switched to by using a link provided by the website, the website usually turns out to be an irrelevant website or a fraudulence website.

Currently, an abnormal element on a web page is usually filtered out before web page rendering is performed. However, because the abnormal element is filtered out before web page rendering is performed, a user cannot sense the filtering operation. Further, when a filtering effect is poor, a large quantity of abnormal elements will remain in the rendered web page. Thus, the abnormal elements displayed on the web page cannot be filtered out. When normal content and the abnormal elements on the web page randomly change, filtering by using the current web page processing method is not precise, leading to a poor abnormal element filtering effect.

The disclosed methods and systems are directed to solve one or more problems set forth above and other problems.

SUMMARY

The present disclose provides a web page processing method and apparatus, by using which abnormal elements in a web page can be more precisely filtered.

One aspect of the present disclosure includes a web page processing method. The method includes obtaining web page elements after web page rendering is performed on a to-be-accessed web page; detecting whether an abnormal element exists in the web page elements; generating and displaying an interaction entrance on the to-be-accessed web page if an abnormal element exists in the web page elements; and obtaining a trigger operation on the interaction entrance and filtering out the abnormal element in response to the trigger operation.

Another aspect of the present disclosure includes a web page processing apparatus. The web page processing apparatus includes a memory storing computer program instructions; and a processor coupled to the memory. When executing the computer program instructions, the processor is configured to perform: obtaining web page elements after web page rendering is performed on a to-be-accessed web page; detecting whether an abnormal element exists in the web page elements; generating and displaying an interaction entrance on the to-be-accessed web page if an abnormal element exists in the web page elements; and obtaining a trigger operation on the interaction entrance and filtering out the abnormal element in response to the trigger operation.

Another aspect of the present disclosure includes a non-transitory computer-readable storage medium. The non-transitory computer-readable storage medium stores computer program instructions executable by at least one processor to perform: obtaining web page elements after web page rendering is performed on a to-be-accessed web page; detecting whether an abnormal element exists in the web page elements; generating and displaying an interaction entrance on the to-be-accessed web page if an abnormal element exists in the web page elements; and obtaining a trigger operation on the interaction entrance and filtering out the abnormal element in response to the trigger operation.

Other aspects of the present disclosure can be understood by those skilled in the art in light of the description, the claims, and the drawings of the present disclosure.

DETAILED DESCRIPTION

To make the objectives, technical solutions, and advantages of the present disclosure clearer and more comprehensible, the following further describes the present disclosure in detail with reference to the accompanying drawings. It should be understood that the specific embodiments described herein are merely used to explain the present disclosure and are not intended to limit the present disclosure.

Figure 1:
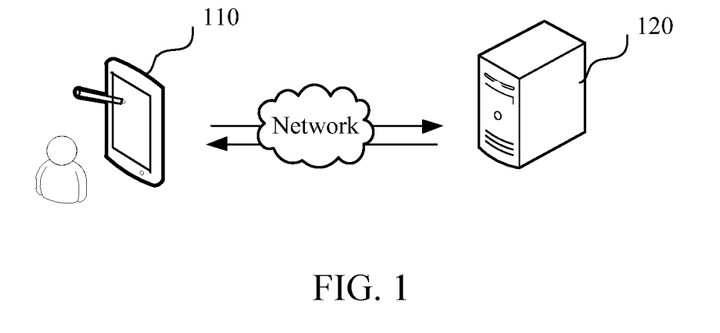
FIG. 1 is a diagram of an application environment of a web page processing method according to embodiments of the present disclosure.

A web page processing method provided in an embodiment of the present disclosure may be applied to an environment shown in FIG. 1. Referring to FIG. 1, a terminal 110 communicates with a server 120 by using a network. The terminal 110 needs to load a web page, parse the web page, and render the web page before displaying the web page.

Usually, some abnormal elements may be intercepted before the web page is rendered. After rendering the web page, the terminal 110 may further detect whether an abnormal element exists in obtained web page elements. If it is detected that an abnormal element exists in the obtained web page elements, the terminal 110 generates an interaction entrance on the web page. When the terminal 110 receives a trigger operation on the interaction entrance, the terminal 110 filters out the abnormal element existing on the web page. The terminal 110 may include any personal computer, notebook computer, desktop computer, smartphone, tablet computer, portable wearable device and the like capable of requesting and displaying a web page. Because the terminal 110 is capable of filtering out the abnormal element existing on the web page after displaying the web page, the abnormal element on the web page can be more precisely filtered.

Figure 2:
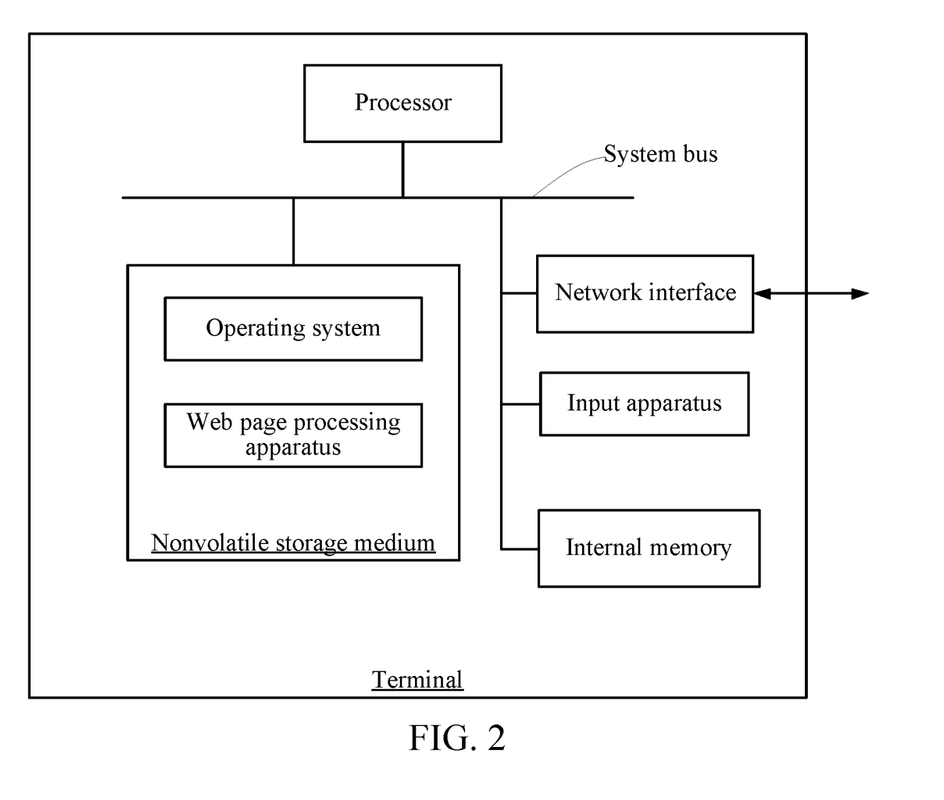
FIG. 2 is a schematic structural diagram of a terminal according to embodiments of the present disclosure.

FIG. 2 is a schematic diagram of an internal structure of a terminal according to embodiments of the present disclosure. The terminal includes a processor, a nonvolatile storage medium, a network interface, an internal memory, and an input apparatus that are connected by using a system bus. The nonvolatile storage medium in the terminal may be a memory storing an operating system and a web page processing apparatus. The web page processing apparatus is configured to implement a web page processing method.

In one example, the nonvolatile storage medium in the terminal stores a computer program. The computer program is used for performing a web page processing method described in the following embodiments. The processor is configured to provide computing and control capabilities to support running of the entire terminal. The internal memory in the terminal provides an environment for running the web page processing apparatus in the nonvolatile storage medium. The network interface is used for performing communication with a server, for example, sending an URL request to the server or receive a resource sent by the server. The input apparatus may be a touch layer on a display screen, or may be a keyboard mouse or a trackball or touchpad disposed on a housing of the terminal.

A person skilled in the art may understand that, in the structure shown in FIG. 2, only a block diagram of a partial structure related to a solution in the present disclosure is shown, and this does not constitute a limit to the terminal to which the solution in the present disclosure is applied. Specifically, the terminal may include more or fewer components than those shown in the figure, or some components may be combined, or a different component deployment may be used.

Figure 3:
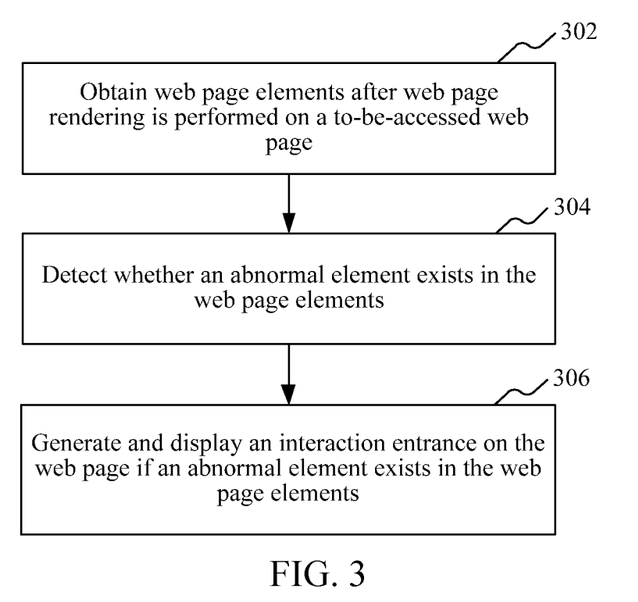
FIG. 3 is a schematic flowchart of a web page processing method according to embodiments of the present disclosure.

As shown in FIG. 3, in an embodiment, a web page processing method is provided. The method may be applied to the terminal shown in FIG. 1 and FIG. 2. The method includes the followings.

Step 302: Obtaining web page elements after web page rendering is performed on a to-be-accessed web page.

In one embodiment, after initiating an access request, for example, an URL request, the terminal loads a web page, parses the web page and renders the web page. Specifically, the terminal performs domain name resolving according to the requested URL, initiates a request to a server and receives a resource (for example, HTML, JS, CSS and an image) sent by the server. The terminal performs syntax analysis on the loaded resource (for example, the HTML, JS, CSS and image) and establishes a corresponding internal data structure (for example, an HTML DOM tree, a JS (Java Script) object attribute table and a CSS (cascade style sheet) style rule). Before rendering the to-be-accessed web page, the terminal may filter out an abnormal element existing on the to-be-accessed web page.

Further, the terminal performs rendering processing on the to-be-accessed web page. Specifically, the terminal may construct a rendering tree by performing location calculation, style calculation or the like on each element on the to-be-accessed web page, and then render the page according to the rendering tree and obtain web page elements after web page rendering is performed. The web page elements obtained after web page rendering is performed include web page content to be normally displayed. Though the terminal has filtered out the abnormal element existing on the to-be-accessed web page before performing rendering, the to-be-accessed web page after rendering may still include some abnormal elements.

Step 304: Detecting whether any abnormal element exists in the web page elements.

In one embodiment, the terminal may detect whether an abnormal element exists in the web page elements according to a domain name of the to-be-accessed web page and a preset web page element key attribute. Specifically, a correspondence between the domain name and the web page element key attribute may be preset, and the web page element key attribute corresponding to the domain name may be a key attribute of the abnormal element. The domain name and the corresponding web page element key attribute may be prestored in the server or the terminal, or may be prestored in both the server and the terminal. The terminal may pre-detect, according to the locally stored domain name and the corresponding web page element key attribute, whether an abnormal element exists in the web page elements obtained after web page rendering is performed. When the web page element key attribute corresponding to the domain name is not found, the server may further be searched for the web page element key attribute, thereby improving matching accuracy.

For example, it is assumed that both the terminal and the server store a correspondence between a domain name and a web page element key attribute. The terminal stores the following preset rule: A domain name rule_domain=www.123.com corresponds to a web page element key attribute rule_attr=attr1|attr2|attr3, that is, has an attribute 1, an attribute 2 or an attribute 3. The server stores the following preset rule: A domain name rule_domain=www.123.com corresponds to a web page element key attribute rule_attr_cloud=attr1|attr2|attr3|attr4|attr5, that is, has an attribute 1, an attribute 2, an attribute 3, an attribute 4 or an attribute 5. In this case, the attributes 4 and 5 have not been synchronously updated to the correspondence stored in the terminal yet.

When a user opens the website www.123.com, the terminal finds the corresponding preset rule attr1, attr2, attr3 according to the domain name www.123.com and opens an already rendered web page in a browser to search the current web page for at least one element whose element attribute matches any of the attr1, the attr2, and the attr3. If at least one element meeting the foregoing condition exists on the current web page, it is determined that an abnormal element exists on the rendered web page; if no element meeting the foregoing condition exists on the current the web page, the terminal sends a request to the server, to request to search for remaining corresponding web page element key attributes according to the domain name www.123.com. The server returns the cloud feature attr1|attr2|attr3|attr4|attr5 to the terminal. The terminal continues to search, according to the received cloud feature, the opened rendered web page for at least one element whose element attribute matches at least one of the web page element key attributes attr1|attr2|attr3|attr4|attr5. If at least one element meeting the foregoing condition is found, it is determined that an abnormal element exists on the rendered web page. Otherwise, it is determined that no abnormal element exists on the rendered web page.

Step 306: Generating and displaying an interaction entrance on the web page if an abnormal element exists in the web page elements.

In one embodiment, if an abnormal element, for example, advertisement, fraudulence, fake, vulgar content or the like that is irrelevant to a theme of the web page and that is a nuisance, is found in the web page elements after web page rendering is performed, the interaction entrance is generated on the web page, and the interaction entrance is invoked when a user operation is received, to implement page function interaction in response to the user operation. Further, the interaction entrance may be a floating window or control presented on the web page or on a display interface of the terminal. The interaction entrance may be used as a one-click filtering entrance, for example, a one-click filtering button. For example, when the user left-clicks the one-click filtering button, the terminal filters out, in response to the click operation of the user, the abnormal element displayed on the web page. When the user right-clicks the one-click filtering button, the user may perform an operation, such as log query, product and function setting, or exit, on the interaction entrance or the terminal.

In addition, the user may set an interface of the interaction entrance, so that the interaction entrance can perform partial filtering, for example, packet filtering, on abnormal elements existing on the rendered web page. The user may further drag the interface of the interaction entrance to move the interaction entrance or modify the location of the interaction entrance.

Step 308: Obtaining a trigger operation on the interaction entrance and filtering out the abnormal element in response to the trigger operation.

In one embodiment, when the user needs to filter out the abnormal element displayed on the rendered web page, the user may trigger the interaction entrance, for example, click the one-click filtering button, so that the terminal invokes the interaction entrance in response to the trigger operation on the one-click filtering button and filters out the abnormal element displayed on the rendered web page.

In addition to the foregoing described filtering out, through one-click filtering, all abnormal elements affecting reading of normal content, the user may perform a packet filtering operation on the abnormal elements according to specific content of the abnormal elements displayed on the rendered web page. For example, the user may filter out one or more groups of abnormal elements according to a requirement. Moreover, the user may further set a function of the interaction entrance to recover an already filtered out abnormal element.

In one embodiment, whether an abnormal element exists in the web page elements obtained after web page rendering is performed is detected. The interaction entrance is generated and displayed on the web page if an abnormal element exists in the web page elements; and the abnormal element is filtered out when the trigger operation on the interaction entrance is obtained. Because the abnormal element existing on the web page can be filtered out after the web page is rendered and the filtering is performed after the user operation is obtained, the abnormal element displayed on the web page can be filtered out. Even if normal content and abnormal elements on the web page often randomly change, the abnormal elements, as long as exist on the rendered web page, can be filtered out through a user operation. In this way, the abnormal elements on the web page can be more precisely filtered.

In an embodiment, the process of detecting whether an abnormal element exists in the web page elements includes: detecting whether a domain name of the to-be-accessed web page has a preset corresponding web page element key attribute, and if the preset corresponding web page element key attribute is found, detecting whether at least one found web page element key attribute exists on the to-be-accessed web page, where if at least one found web page element key attribute exists on the to-be-accessed web page, an abnormal element exists in the web page elements; otherwise, no abnormal element exists in the web page elements.

Further, in an embodiment, the process of detecting whether a domain name of the to-be-accessed web page has a preset corresponding web page element key attribute includes: detecting whether a domain name of a website of the to-be-accessed web page has a preset corresponding web page element key attribute, and if the preset corresponding web page element key attribute is found, performing the step of detecting whether at least one found web page element key attribute exists on the to-be-accessed web page; otherwise, further detecting whether a top-level domain name of the website of the to-be-accessed web page has a preset corresponding web page element key attribute, and if the preset corresponding web page element key attribute is found, performing the step of detecting whether at least one found web page element key attribute exists on the to-be-accessed web page; otherwise, no abnormal element exists in the web page elements.

Figure 4:
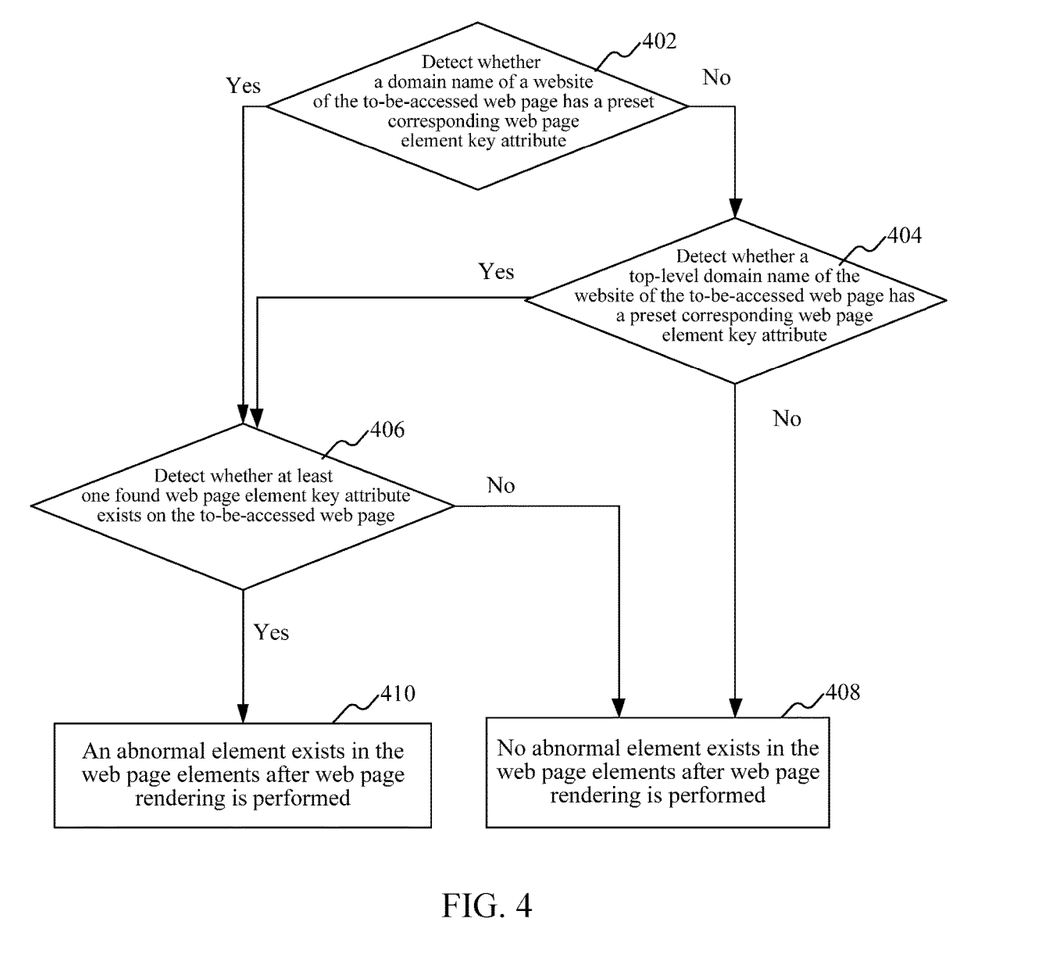
FIG. 4 is a schematic flowchart of detecting whether an abnormal element exists in web page elements according to embodiments of the present disclosure.

Specifically, in an embodiment, as shown in FIG. 4, the process of detecting whether an abnormal element exists in the web page elements includes the followings.

Step 402: Detecting whether a domain name of a website of the to-be-accessed web page has a preset corresponding web page element key attribute, and if the preset corresponding web page element key attribute is found, proceeding to step 406; otherwise, proceeding to step 404.

In one embodiment, the web page element key attribute is preset and the web page element key attribute is an attribute feature of the abnormal element. Specifically, the web page element key attribute includes a Class attribute and an ID attribute. In another embodiment, a style attribute or other attributes may further be included. In one embodiment, the correspondence between the domain name and the web page element key attribute is further preset. The correspondence indicates that an abnormal element exists on a web site of the domain name.

Further, the correspondence may be stored in the server (cloud) or the terminal, or stored in both the server and the terminal. The correspondence, when updated in the server, can be synchronously updated in the terminal. The terminal may first detect, according to the correspondence between the domain name and the web page element key attribute that is stored in the terminal, whether the domain name of the website of the to-be-accessed web page has a preset corresponding web page element key attribute. If the preset corresponding web page element key attribute is found, proceed to step 404. If the preset corresponding web page element key attribute is not found, the server may further be searched. If the preset corresponding web page element key attribute is found in the server, proceed to step 404. If the corresponding web page element key attribute is not found in the server, proceed to step 406.

Step 404: Detecting whether a top-level domain name of the website of the to-be-accessed web page has a preset corresponding web page element key attribute, and if the preset corresponding web page element key attribute is found, proceed to step 406, otherwise, proceed to step 408.

In one embodiment, if the preset corresponding web page element key attribute of the domain name of the website of the to-be-accessed web page is not found, it may further be detected whether the top-level domain name of the website of the to-be-accessed web page has a preset corresponding web page element key attribute. As described above, the correspondence between the domain name and the web page element key attribute is preset. If the preset corresponding web page element key attribute of the top-level domain name of the website of the to-be-accessed web page is found, it indicates that an abnormal element may also exist on the to-be-accessed web page. Specifically, the terminal may first detect whether the top-level domain name of the website of the to-be-accessed web page has a preset corresponding web page element key attribute in the terminal. If the preset corresponding web page element key attribute is found, proceed to step 406. If the preset corresponding web page element key attribute is not found, the server may be searched for. If the preset corresponding web page element key attribute is found in the server, proceed to step 406; otherwise, proceed to step 408.

Step 406: Detecting whether at least one found web page element key attribute exists on the to-be-accessed web page, and if at least one found web page element key attribute exists on the to-be-accessed web page, proceed to step 410; otherwise, proceed to step 408.

Step 408: Determining that no abnormal element exists in the web page elements after web page rendering is performed.

Step 410: Determining that an abnormal element exists in the web page elements after web page rendering is performed.

In one embodiment, when the preset corresponding web page element key attribute of the domain name or the top-level domain name of the website of the to-be-accessed web page is found, it is detected whether at least one found web page element key attribute exists on the to-be-accessed web page, that is, matching is performed between the found preset web page element key attribute and key attribute of the web page elements on the to-be-accessed web page after web page rendering is performed. If at least one key attribute is matched, it indicates that abnormal elements that are matched according to the domain name include an abnormal element in the to-be-accessed web page, so that an abnormal element(s) exists on the to-be-accessed web page. If no key attribute is matched, no abnormal element exists on the to-be-accessed web page.

Specifically, the preset web page element key attribute includes a Class attribute, an id attribute, a style attribute, and/or other attributes. When matching the web page element on the to-be-accessed web page, the attributes can be matched one by one. For example, code of an abnormal element on a web page is: <div id="wAdFlyBlttom" class="onlyPc"> . . . </div>. A web page element key attribute corresponding to the domain name is preset to: div[id="wAdFlyBlttom"] or div[class="onlyPc"], so that an abnormal element exists on the to-be-accessed web page.

In one embodiment, matching is performed between the domain name of the to-be-accessed web page and the preset domain name to obtain a web page element key attribute of the abnormal element, and then it is detected whether the matched web page element key attribute exists on the to-be-accessed web page. If the matched web page element key attribute exists on the to-be-accessed web page, it indicates that an abnormal element exists on the to-be-accessed web page; otherwise, no abnormal element exists. Because the web page element key attribute for performing matching stored in the server or the terminal may expire, it can be ensured, by performing matching twice, that a matched key attribute found on the to-be-accessed web page is a preset key attribute of a determined abnormal element. This can ensure accuracy of detecting an abnormal element on the to-be-accessed web page.

In an embodiment, if an abnormal element exists in the rendered web page elements, an interaction entrance is generated and displayed on the web page. For example, if an abnormal element exists in the web page elements, preset JS code is injected to the rendered to-be-accessed web page, and the interaction entrance is generated and displayed on the web page by using the JS code. The JS code is further used for filtering out all abnormal elements or performing packet filtering in response to a trigger operation on the interaction entrance.

In an embodiment, the process of filtering out the abnormal element in response to the trigger operation includes: obtaining location and size information of the abnormal element on the web page and obtaining location and size information of the interaction entrance on the web page; and moving, based on the location and size information of the abnormal element on the web page and the location and size information of the interaction entrance on the web page and according to a preset animation effect, the abnormal element to a location corresponding to the interaction entrance until the abnormal element disappears.

Figure 5:
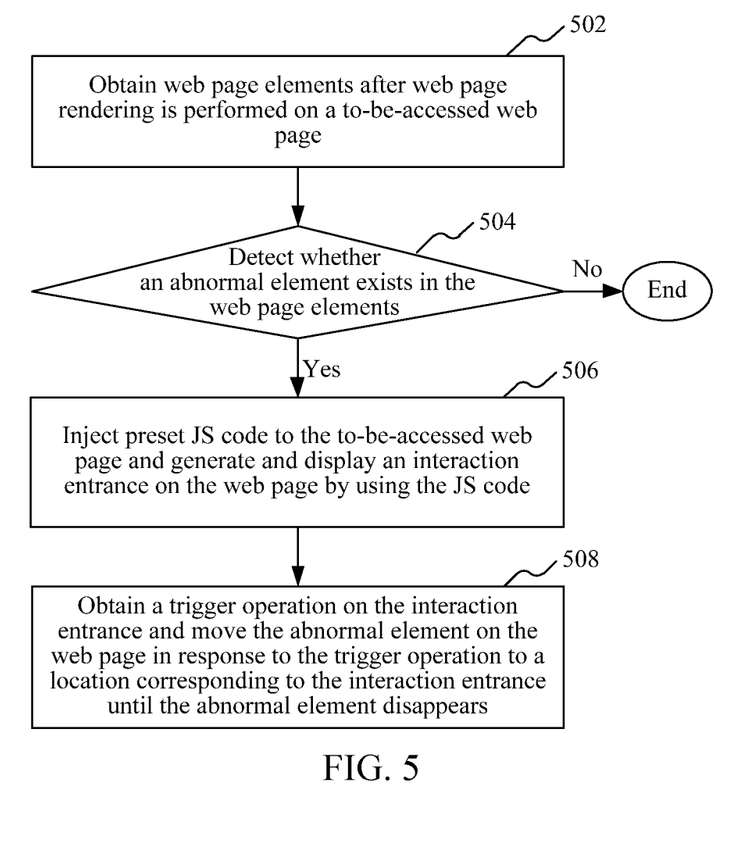
FIG. 5 is a schematic flowchart of a web page processing method according to embodiments of the present disclosure.

As shown in FIG. 5, in an embodiment, a web page processing method is provided. The method may be applied to the terminal shown in FIG. 1 or FIG. 2, and may include the followings.

Step 502: Obtaining web page elements after web page rendering is performed on a to-be-accessed web page.

In one embodiment, the terminal loads a web page, parses the web page and renders the web page after initiating a URL request. After all to-be-executed JS on the web page is executed, loading of the entire page is complete, and a user can view an integrated web page. An interception operation may be performed on some abnormal elements existing on the web page before web page rendering is performed, as to intercept the abnormal elements and then perform web page rendering. The entire web page can be displayed after web page rendering is performed, and web page elements are displayed on the web page. In addition to normally displayed web page content, the web page elements may include some abnormal elements.

Step 504: Detecting whether an abnormal element exists in the web page elements. If an abnormal element exists in the web page elements, proceed to step 506; otherwise, the procedure ends.

Specifically, matching is performed between a domain name of the to-be-accessed web page and a domain name stored in the terminal. After a matched domain name is found, a preset web page element key attribute corresponding to the domain name is obtained. If no matched domain name is found, the server is searched for a matched domain name, to obtain a preset web page element key attribute corresponding to the domain name of the to-be-accessed web page. The domain name of the to-be-accessed web page includes a domain name and a top-level domain name of a website of the to-be-accessed web page. During matching, the domain name of the website of the to-be-accessed web page is matched first, and the top-level domain name of the website of the to-be-accessed web page is further matched when no matched domain name is found.

Further, after the preset corresponding web page element key attribute is matched, it is detected whether at least one found web page element key attribute exists on the to-be-accessed web page. If at least one found web page element key attribute exists on the to-be-accessed web page, it indicates that the matched web page element key attribute includes the web page element key attribute on the to-be-accessed web page and an abnormal element exists on the to-be-accessed web page; otherwise, no abnormal element exists on the to-be-accessed web page.

Step 506: Injecting preset JS code to the to-be-accessed web page and generating and display an interaction entrance on the web page by using the JS code.

In one embodiment, a browser plug-in may be injected to a web page browser.

The browser plug-in may be used for detecting whether an abnormal element exists in the web page elements obtained after web page rendering is performed. If an abnormal element exists in the web page elements, preset JS code is injected to the web page The JS code can be used for generating an interaction entrance on the web page and implement function interaction of the interaction entrance.

Figure 6:
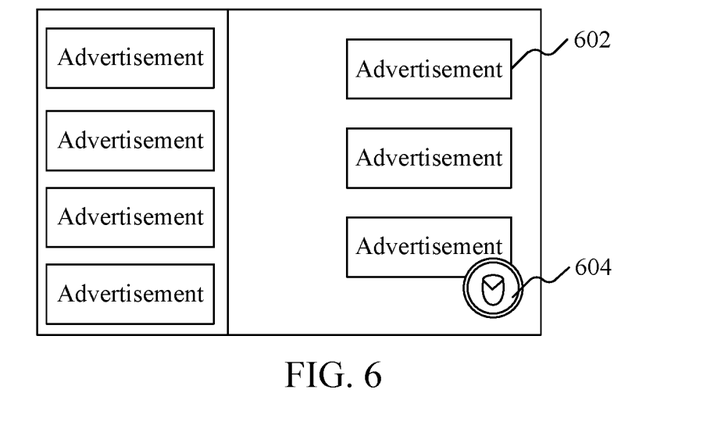
FIG. 6 is a schematic diagram of an interface after web page rendering is performed according to embodiments of the present disclosure.

Specifically, the interaction entrance may be an entrance for filtering out an abnormal element on a web page, for example, may be a control displayed on the page such as a one-click filtering button. As shown in FIG. 6, an entire web page is displayed after web page rendering is performed. Some abnormal elements 602 exist on the page. The abnormal elements 602 may be advertisement content, fake content or other content irrelevant to a theme of the web page. A one-click filtering button 604 is generated on the page when the abnormal elements 602 are detected. The one-click filtering button 604 may be an icon shown in FIG. 6.

Step 508: Obtaining a trigger operation on the interaction entrance and moving the abnormal element on the web page in response to the trigger operation to a location corresponding to the interaction entrance until the abnormal element disappears.

In one embodiment, function interaction of the interaction entrance can be implemented by using the preset JS code injected to the web page. Specifically, when the user triggers the interaction entrance by, for example, clicking on the one-click filtering button 604, the preset JS code responds to the operation, so that location and size information of the abnormal element on the web page and location and size information of the interaction entrance on the web page are obtained. The user moves, based on the location and size information of the abnormal element on the web page and the location and size information of the interaction entrance on the web page and according to a preset animation effect, the abnormal element to a location corresponding to the interaction entrance until the abnormal element disappears.

Specifically, when it is detected that an abnormal element exists on the to-be-accessed web page, the abnormal element may be obtained according to the matched web page element key attribute, thereby obtaining location and size information of the abnormal element. The location and size information of the interaction entrance may be obtained according to the preset JS code. Further, a distance between each abnormal element and the interaction entrance may be obtained according to the location and size information of abnormal element and the location and size information of the interaction entrance, and the abnormal element is moved to the location of the interaction entrance according to the distance and is then the abnormal element hidden and disappears.

Further, in a process of moving each abnormal element to the location of the interaction entrance, the size of the abnormal element can be gradually decreased, until the abnormal element is moved to the location of the interaction entrance and disappears. In this way, an animation effect that the abnormal element is dynamically moved and becomes increasingly smaller until disappearance is achieved. Specifically, the animation effect can be achieved by using the following method.

It is assumed that an abnormal element is A with a size of Sa and the interaction entrance is B. A distance between A and B is L obtained through calculation according to a location of A and that of B. A total time length of the animation effect is preset to be T, and a time interval of a timer is set to be t seconds (that is, the timer runs every t seconds). Therefore, a total quantity of times of moving the abnormal element A to the interaction entrance B is $n=T/t$. A moves toward B by a distance $L\Delta=L/n$ each time the timers runs and the abnormal element A is decreased by m times, where $m=Sa/n$. The size Sa of A is set to 0 and A is set to be hidden at the final running. In this way, each abnormal element A disappears when translated to the location of the interaction entrance B.

Figure 7:
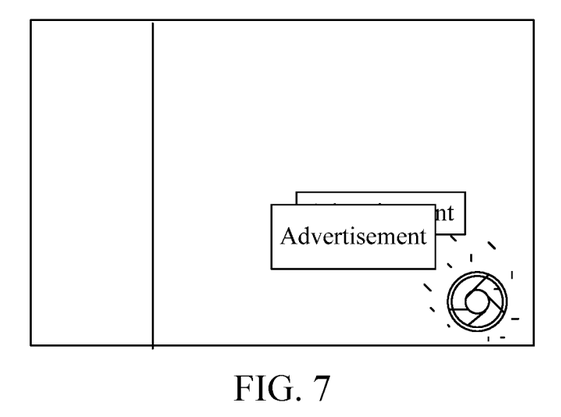
FIG. 7 is an effect drawing of abnormal element filtering according to embodiments of the present disclosure.

As shown in FIG. 7, the abnormal element can be filtered out by using an animation effect. The abnormal element is translated to the location of the interaction entrance and is increasingly smaller until disappears at the location of the interaction entrance. In a process of recycling the abnormal element, an animation effect indicating recycling may be presented by the interaction entrance, thereby achieving a display effect of recycling the abnormal element.

In one embodiment, the interaction entrance is displayed when it is detected, by setting the browser plug-in, that an abnormal element exists in the web page elements obtained after web page rendering is performed. The entire web page is loaded after web page rendering is performed, so that the user can view the abnormal element existing on the web page and can choose whether to filter out the abnormal element on the page. When choosing to filter out the abnormal element, the user may perform a trigger operation on the interaction entrance to filter out the abnormal element displayed on the web page. In addition, the abnormal element may be moved, by using the animation effect, to the location of the interaction entrance until the abnormal element disappears. In this way, the abnormal element displayed on the web page is recycled.

Figure 8:
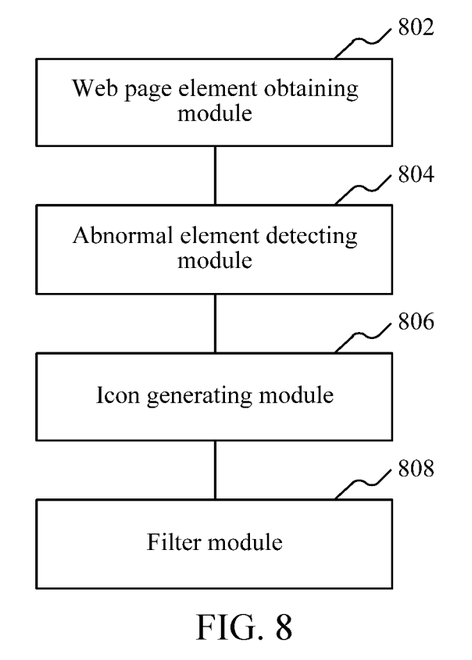
FIG. 8 is a structural block diagram of a web page processing apparatus according to embodiments of the present disclosure.

As shown in FIG. 8, in an embodiment, a web page processing apparatus is further provided. The apparatus includes: a web page element obtaining module 802, an abnormal element detecting module 804, an icon generating module 806, and a filter module 808, etc.

The web page element obtaining module 802 is configured to obtain web page elements after web page rendering is performed on a to-be-accessed web page. The abnormal element detecting module 804 is configured to detect whether an abnormal element exists in the web page elements. The icon generating module 806 is configured to generate and display an interaction entrance on the web page if an abnormal element exists in the web page elements. The filter module 808 is configured to obtain a trigger operation on the interaction entrance and filter out the abnormal element in response to the trigger operation.

Figure 9:
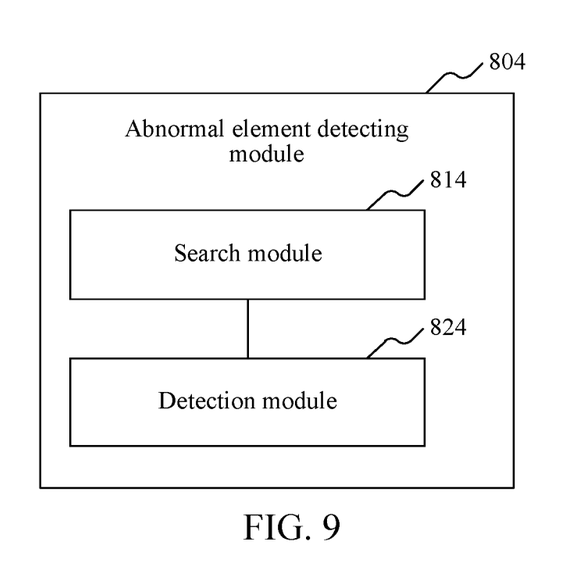
FIG. 9 is a structural block diagram of an abnormal element detecting module according to embodiments of the present disclosure.

In an embodiment, as shown in FIG. 9, the abnormal element detecting module 804 includes a search module 814, and a detection module 824.

The search module 814 is configured to detect whether a domain name of the to-be-accessed web page has a preset corresponding web page element key attribute. The detection module 824 is configured to: if the preset corresponding web page element key attribute of the domain name of the to-be-accessed web page is found, detect whether at least one found web page element key attribute exists on the to-be-accessed web page. If at least one found web page element key attribute exists on the to-be-accessed web page, it is determined that an abnormal element exists in the web page elements; otherwise, it is determined that no abnormal element exists in the web page elements.

In an embodiment, the search module 814 is configured to detect whether a domain name of a website of the to-be-accessed web page has a preset corresponding web page element key attribute; the detection module 824 is further configured to: if the search module 814 detects that the domain name of the website of the to-be-accessed web page has a preset corresponding web page element key attribute, detect whether at least one found web page element key attribute exists on the to-be-accessed web page. In one embodiment, the search module 814 is further configured to: if the corresponding web page element key attribute of the domain name of the website of the to-be-accessed web page is not found, further detect whether a top-level domain name of the website of the to-be-accessed web page has a preset corresponding web page element key attribute. In one embodiment, the detection module 824 is further configured to: if the preset corresponding web page element key attribute of the top-level domain name of the website of the to-be-accessed web page is found, detect whether at least one found web page element key attribute exists on the to-be-accessed web page; otherwise, no abnormal element exists in the web page elements.

In an embodiment, the icon generating module 806 is configured to: if an abnormal element exists in the web page elements, inject preset JS code to the to-be-accessed web page and generate and display an interaction entrance on the web page by using the JS code, the JS code further being used for filtering out the abnormal element in response to a trigger operation on the interaction entrance.

In an embodiment, the filter module 808 is configured to: obtain location and size information of the abnormal element on the web page and obtain location and size information of the interaction entrance on the web page; and move, based on the location and size information of the abnormal element on the web page and the location and size information of the interaction entrance on the web page and according to a preset animation effect, the abnormal element to a location corresponding to the interaction entrance until the abnormal element disappears.

A person of ordinary skill in the art may understand that all or some of the procedures of the methods in the foregoing embodiments may be implemented by a computer program instructing relevant hardware. The program may be stored in a nonvolatile computer-readable storage medium. When the program runs, the procedures of the foregoing method embodiments are performed. The storage medium may be a magnetic disc, an optical disc, a read-only memory (ROM), or the like.

The foregoing embodiments only show several implementations of the present disclosure and are described in detail, but they should not be construed as a limit to the scope of the patent application. It should be noted that, a person of ordinary skill in the art may make various changes and improvements without departing from the ideas of the present disclosure, which shall all fall within the protection scope of the present disclosure. Therefore, the protection scope of the patent application shall be subject to the appended claims.

What is claimed is:

1. A web page processing method, comprising:
   obtaining, by a computing device, web page elements after web page rendering is performed on a web page;
   detecting, by the computing device, whether an abnormal element exists in the web page elements;
   generating and displaying, by the computing device, an interaction entrance on the web page if an abnormal element exists in the web page elements; and
   obtaining, by the computing device, a trigger operation on the interaction entrance and filtering out the abnormal element in response to the trigger operation, including:
      causing a size reduction on the abnormal element to form a first reduced abnormal element;
      displaying the first reduced abnormal element at a first location on the web page for a first period of time;
      after the first period of time, causing a size reduction on the first reduced abnormal element to form a second reduced abnormal element;
      displaying the second reduced abnormal element at a second location on the web page for a second period of time, wherein the second location is closer than the first location to the interaction entrance; and
      causing the second reduced abnormal element to move into the interaction entrance to eventually disappear from the web page.

2. The web page processing method according to claim 1, wherein the detecting whether the abnormal element exists in the web page elements comprises:
   detecting whether a domain name of the web page has a preset corresponding web page element key attribute;
   when the preset corresponding web page element key attribute is detected, detecting whether at least one found web page element key attribute exists on the web page;
   when at least one found web page element key attribute exists on the web page, determining that the abnormal element exists in the web page elements; and
   when at least one found web page element key attribute does not exist on the web page, determining that the abnormal element does not exist in the web page elements.

3. The web page processing method according to claim 1, wherein the interaction entrance is positioned separately from the abnormal element on the web page.

4. The web page processing method according to claim 2, further comprising:
   presetting, by the computing device, a correspondence between the domain name of the web page and the preset corresponding web page element key attribute.

5. The web page processing method according to claim 2, wherein the detecting whether the domain name of the web page has the preset corresponding web page element key attribute comprises:
   detecting whether a top-level domain name of the website of the web page has the preset corresponding web page element key attribute.

6. The web page processing method according to claim 5, wherein the detecting whether the top-level domain name of the website of the web page has the preset corresponding web page element key attribute comprises:

when the top-level domain name is detected to have the preset corresponding web page element key attribute, detecting whether the at least one found web page element key attribute exists on the web page; and when the top-level domain name is not detected to have the preset corresponding web page element key attribute, determining that the abnormal element does not exist in the web page elements.

7. The web page processing method according to claim 1, wherein the generating and displaying an interaction entrance on the web page if the abnormal element exists in the web page elements comprises:
   if the abnormal element exists in the web page elements, injecting preset JS code to the web page and generating and displaying the interaction entrance on the web page by using the JS code.

8. The web page processing method according to claim 1, wherein the filtering out the abnormal element in response to the trigger operation comprises:
   obtaining location and size information of the abnormal element on the web page and obtaining location and size information of the interaction entrance on the web page.

9. The web page processing method according to claim 1, wherein the detecting, by the computing device, whether the abnormal element exists in the web page elements comprises:
   when the computing device detects that the abnormal element does not exisit in the web page elements according to locally stored domain name and corresponding web page element key attribute, requesting, by the computing device, a server to search for the web page element key attribute;
   when the server determines that at least one found web page element key attribute exists on the web page, determining that the abnormal element exists in the web page elements; and
   when the server determines that at least one found web page element key attribute does not exist on the web page, determining that the abnormal element does not exisit in the web page elements.

10. A web page processing apparatus, comprising: a memory storing computer program instructions; and a processor coupled to the memory and, when executing the computer program instructions, configured to perform:
   obtaining web page elements after web page rendering is performed on a web page;
   detecting whether an abnormal element exists in the web page elements;
   generating and displaying an interaction entrance on the web page if an abnormal element exists in the web page elements; and
   obtaining a trigger operation on the interaction entrance and filtering out the abnormal element in response to the trigger operation, including:
      causing a size reduction on the abnormal element to form a first reduced abnormal element;
      displaying the first reduced abnormal element at a first location on the web page for a first period of time;
      after the first period of time, causing a size reduction on the first reduced abnormal element to form a second reduced abnormal element;
      displaying the second reduced abnormal element at a second location on the web page for a second period of time, wherein the second location is closer than the first location to the interaction entrance; and
      causing the second reduced abnormal element to move into the interaction entrance to eventually disappear from the web page.

11. The web page processing apparatus according to claim 10, wherein the interaction entrance is positioned separately from the abnormal element on the web page.

12. The web page processing apparatus according to claim 10, wherein the detecting whether the abnormal element exists in the web page elements comprises:
   detecting whether a domain name of the web page has a preset corresponding web page element key attribute;
   when the preset corresponding web page element key attribute is detected, detecting whether at least one found web page element key attribute exists on the web page;
   when at least one found web page element key attribute exists on the web page, determining that the abnormal element exists in the web page elements; and
   when at least one found web page element key attribute does not exist on the web page, determining that the abnormal element does not exist in the web page elements.

13. The web page processing apparatus according to claim 12, further comprising:
   presetting, by the computing device, a correspondence between the domain name of the web page and the preset corresponding web page element key attribute.

14. The web page processing apparatus according to claim 10, wherein the detecting, by the computing device, whether the abnormal element exists in the web page elements comprises:
   when the computing device detects that the abnormal element does not exist in the web page elements according to locally stored domain name and corresponding web page element key attribute, requesting, by the computing device, a server to search for the web page element key attribute;
   when the server determines that at least one found web page element key attribute exists on the web page, determining that the abnormal element exists in the web page elements; and
   when the server determines that at least one found web page element key attribute does not exist on the web page, determining that the abnormal element does not exist in the web page elements.

15. A non-transitory computer-readable storage medium storing computer program instructions executable by at least one processor to perform:
   obtaining web page elements after web page rendering is performed on a web page;
   detecting whether an abnormal element exists in the web page elements;
   generating and displaying an interaction entrance on the web page if an abnormal element exists in the web page elements; and
   obtaining a trigger operation on the interaction entrance and filtering out the abnormal element in response to the trigger operation, including:
      causing a size reduction on the abnormal element to form a first reduced abnormal element;
      displaying the first reduced abnormal element at a first location on the web page for a first period of time;
      after the first period of time, causing a size reduction on the first reduced abnormal element to form a second reduced abnormal element;
      displaying the second reduced abnormal element at a second location on the web page for a second period of time, wherein the second location is closer than the first location to the interaction entrance; and causing the second reduced abnormal element to move into the interaction entrance to eventually disappear from the web page.

16. The non-transitory computer-readable storage medium according to claim 15, wherein the interaction entrance is positioned separately from the abnormal element on the web page.

17. The non-transitory computer-readable storage medium according to claim 15, wherein the detecting whether the abnormal element exists in the web page elements comprises:

detecting whether a domain name of the web page has a preset corresponding web page element key attribute;

when the preset corresponding web page element key attribute is detected, detecting whether at least one found web page element key attribute exists on the web page;

when at least one found web page element key attribute exists on the web page, determining that the abnormal element exists in the web page elements; and when at least one found web page element key attribute does not exist on the web page, determining that the abnormal element does not exist in the web page elements.

* * * * *